United States Patent [19]

Ueda

[11] E Re. 28,944

[45] Reissued Aug. 31, 1976

[54] HYDRAULIC BRAKE SYSTEM

[75] Inventor: Atumi Ueda, Kariya, Japan

[73] Assignee: Asin Seiki Kabushiki Kaisha, Kariya, Japan

[22] Filed: Jan. 2, 1975

[21] Appl. No.: 538,055

Related U.S. Patent Documents

Reissue of:

[64] Patent No.: 3,708,030
Issued: Jan. 2, 1973
Appl. No.: 75,063
Filed: Sept. 23, 1970

[30] Foreign Application Priority Data

Sept. 24, 1969 Japan ..... 44-75965
Sept. 24, 1969 Japan ..... 44-75966
Sept. 24, 1969 Japan ..... 44-75967

[52] U.S. Cl. ..... 180/132; 60/404; 60/418

[51] Int. Cl.[2] ..... B62D 5/06

[58] Field of Search ..... 180/79.2 R, 79.2 B; 60/404, 405, 418

[56] References Cited

UNITED STATES PATENTS

| | | | |
|---|---|---|---|
| 2,396,984 | 3/1946 | Broadston et al. | 60/404 |
| 2,804,753 | 9/1957 | Leduc | 60/404 |
| 3,142,962 | 8/1964 | Lohbauer | 60/418 |
| 3,364,821 | 1/1968 | Gephart | 180/79.2 R |

*Primary Examiner*—Philip Goodman
*Assistant Examiner*—John A. Pekar
*Attorney, Agent, or Firm*—Sughrue, Rothwell, Mion, Zinn & Macpeak

[57] ABSTRACT

A vehicle having a hydraulic power brake system and a hydraulic power steering system, each having its own pump may utilize the power steering system pump as an emergency back up pump for the power brake system should the pump for the power brake system fail. The fluid under pressure in the accumulator for the power brake system will act upon failure of the power brake pump to initiate the switch over to the power steering pump.

13 Claims, 5 Drawing Figures

Figure 1A:
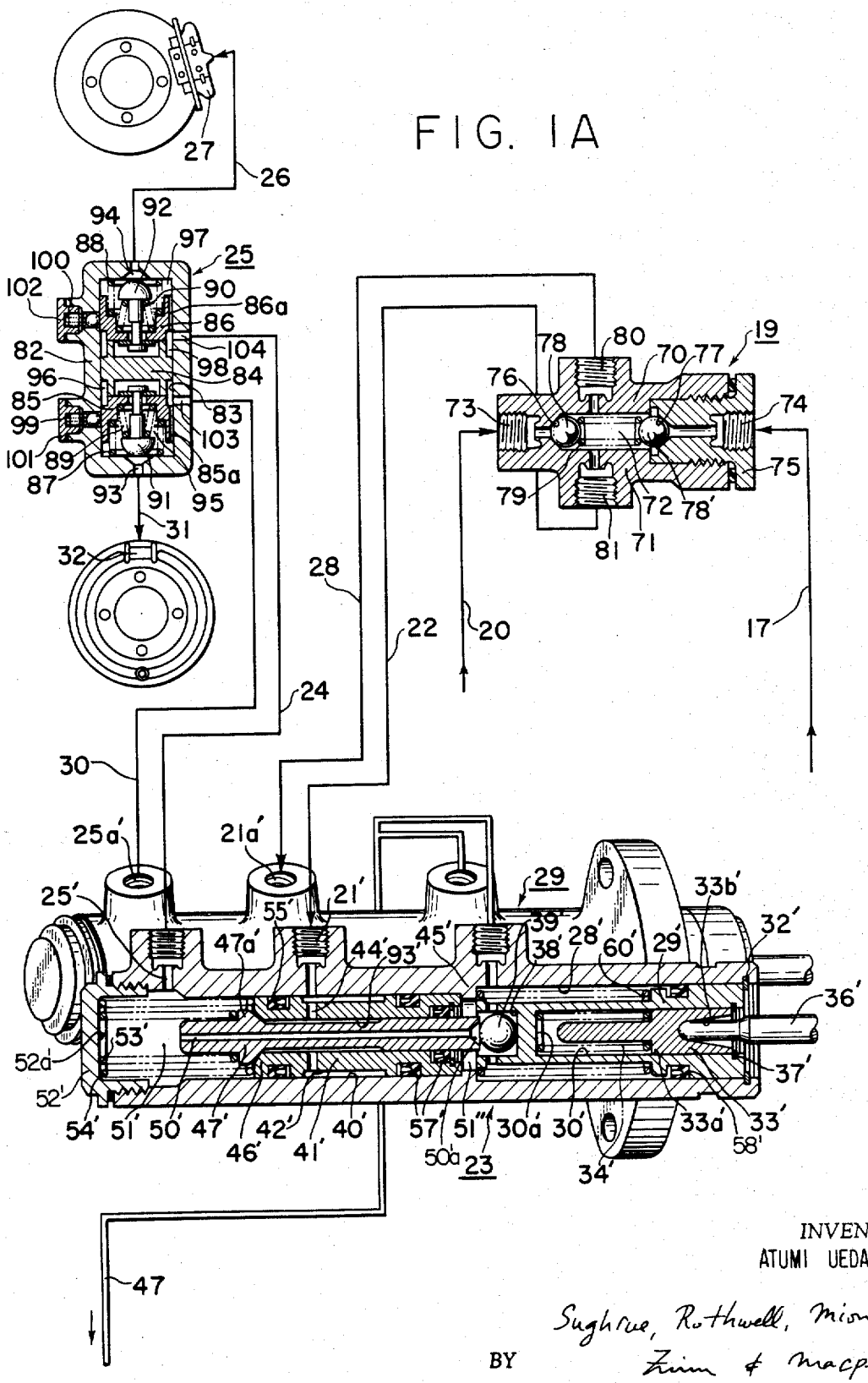

INVENTOR
ATUMI UEDA

BY Sughrue, Rothwell, Mion, Zinn & Macpeak
ATTORNEYS

HYDRAULIC BRAKE SYSTEM

Matter enclosed in heavy brackets [ ] appears in the original patent but forms no part of this reissue specification; matter printed in italics indicates the additions made by reissue.

This invention relates to improvements and relating to a hydraulic power brake system adapted for use on a powered vehicle, especially an automotive vehicle.

The conventional hydraulic power brake system contains a hydraulic power source, preferably a pump. Should the pump fail to operate by a certain or other cause during travel of the vehicle, the braking system would become disable to operate, resulting in a very dangerous state for the driver and the possible passengers on board the vehicle.

The main object is to provide a hydraulic brake system of the above kind, capable of obviating the aforementioned conventional drawback.

A further object is to provide a hydraulic brake system of the above kind wherein under normal operating conditions of the system, a first pump means for the brake system and a second pump means used for a certain other hydraulic system, preferably the vehicle power steering system operable independently to each other, but in case of a functional failure of the first pump means, the second pump means is automatically brought into pressure fluid communication with a pressure accumulator provided in the hydraulic brake system for replenishing the deficient pressure energy thereto and making the latter ready for its operation.

These and further objects, advantages and features of the invention will become more apparent when read the following detailed description of the invention by reference to the accompanying drawings illustrative of several preferred embodiments of the invention only by way of example.

Figure 1B:
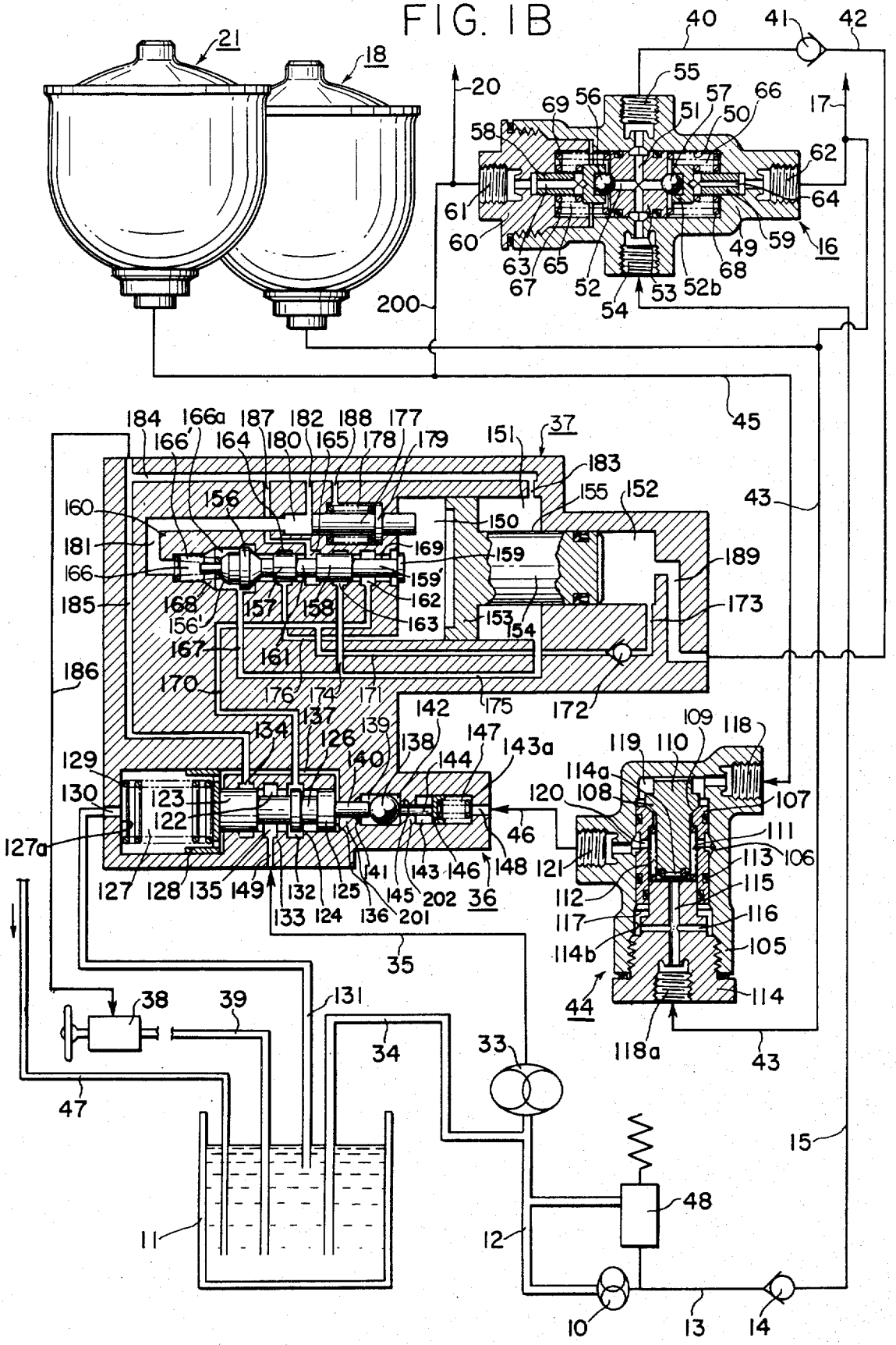

In the drawings:

FIGS. 1A and 1B constitute in combination a single drawing illustrative of a schematic general arrangement of a first embodiment of the improved hydraulic brake system according to this invention, wherein, however, several preferred constituents being shown each in an enlarged and longitudinal sectional view.

Figure 2:
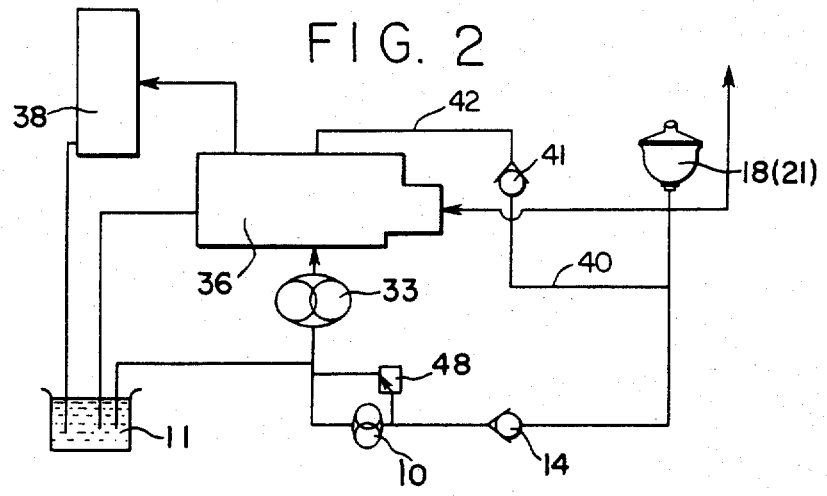
Figure 3:
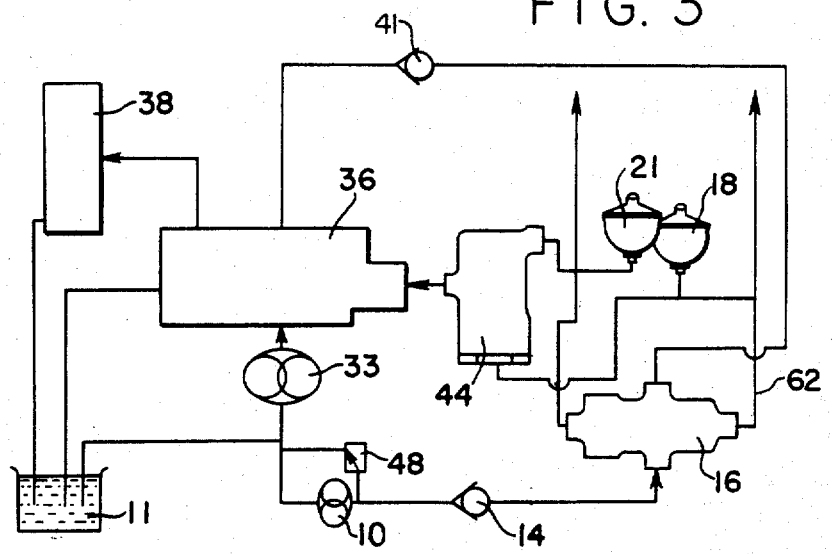
Figure 4:
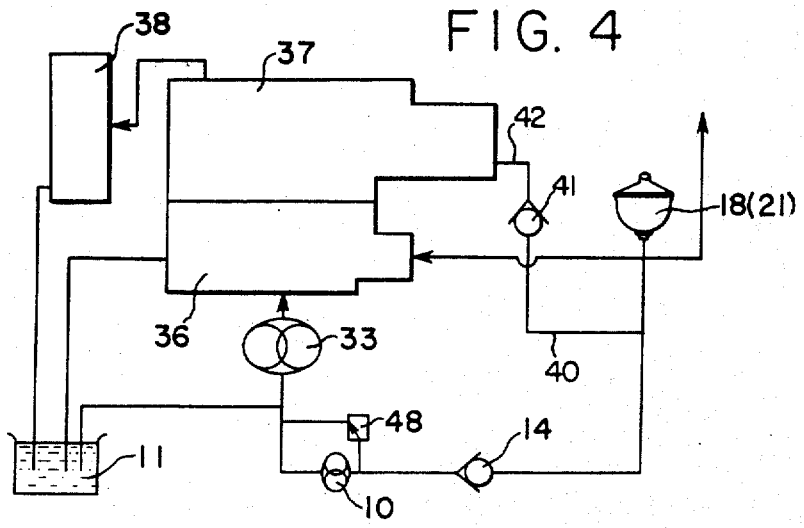

FIGS. 2–4 are block diagrams illustrative of a second, a third and a fourth embodiment of the invention.

Referring now to the accompanying drawings, several preferred embodiments of the invention will be described in detail hereinbelow.

At first in FIGS. 1–2, illustrative of the first embodiment of the invention, a high pressure, low delivery type pump 10 is provided in a hydraulic brake circuit as shown, said pump being driven from an automotive dynamo or the like conventional prime mover, although not shown.

The pump 10 is so arranged that it sucks oil from reservoir vessel 11 through pipings 34 and 12, so as to elevate the oil in its pressure, the thus pressure-elevated oil is conveyed through a piping 13, a check valve 14 and a further piping 15 to inlet 54 of a first safety valve unit 16 which is formed with an outlet 62 hydraulically connected through a piping 17 to an accumulator 18. Said outlet 62 is connected at the same time hydraulically with port 74 of a second safety valve unit 19; the first safety unit 16 is formed with a second outlet 61 which is hydraulically connected through pipings 20 and 200 to a further accumulator 21, and through said piping 20 with further port 73 of the second safety valve unit 19.

The second valve unit 19 is formed with an outlet port 81 which is hydraulically connected through piping 22 to an inlet 21' of a control valve unit 23, the latter being further hydraulically connected through an outlet 25' and a piping 24 to an inlet port 104 of third safety valve unit 25; an outlet port 94 of the latter is connected hydraulically through piping 26 to a wheel cylinder 27.

Another outlet port 80 of said second safety valve 19 is hydraulically connected through piping 28 and inlet 21a' to another control valve 29 which has an outlet 25a' connected through piping 30 to another inlet port 103 of said third safety valve 25, an outlet port 93 of the latter being hydraulically connected through piping 31 to another wheel cylinder 32.

In a power steering hydraulic circuit, a low pressure, high delivery capacity pump 33 is provided as shown, said pump 33 being arranged to be driven from the automotive drive engine or the like prime mover, also not shown.

This pump 33 sucks oil through piping 34 from reservoir vessel 11, and the thus pressurized oil is conveyed through piping 35 to an unloading valve unit 36, then through an intensifier 37 to a power steering unit 38 shown only schematically and then through a drain piping 39 back to said reservoir vessel 11 for providing a feed back oil flow.

Another inlet port 55 of said first safety valve unit 16 is hydraulically connected through piping 40, check valve 41 and a further piping 42 to a port 189 of said intensifier 37. Accumulator 18 is hydraulically connected through piping 43 to an inlet port 118a of a fourth safety valve unit 44, while another accumulator 21 is connected through pipings 200 and 45 to another inlet port 118 of said fourth safety valve unit 44.

An outlet port 121 of valve unit 44 is connected hydraulically through piping 46 to a control inlet port 148 of said unloading valve unit 36. Control valve units 23 and 29 are connected through piping 47 to said reservoir 11.

A relief valve 48 is provided between said pipings 13 and 12 and for said pump 10.

First safety valve unit 16 comprises a main body 49 which is formed with a cylinder bore 50 receiving slidably therein a piston 53 which is formed with crossed passages 51 and 52. Normally, the piston 53 is so positioned that the both ends of the passage 51 are kept in registration with inlet ports 54 and 55, respectively, while the ends of the passage 52 form valve seats 52a and 52b, respectively cooperating respective ball valves 56 and 57. These ball valves are urged to move inwards by respective valve holder pistons 58 and 59 which are received slidably in a plug 60 and the cylinder body 49, said plug being threadedly coupled with the left-hand end of the cylinder body in FIG. 1A.

Pistons 58 and 59 are formed with respective axial bores 63 and 64. Bore 63 is kept in fluid communication with outlet port 61 which is bored axially through said plug 60, on the one hand, and with a left-hand fluid chamber 65 formed within the cylinder bore 50 at the left-hand side of pistons 53, on the other hand. Bore 64 is kept in fluid communication with outlet port 62 which is bored axially through the right-hand end of main cylinder body 49, on the one hand, and with a right-hand fluid chamber 66 formed again within the cylinder bore 50 at the right-hand side of piston 53, on the other. At the opposite sides of the piston 53 and within the fluid chambers 65 and 66, there are balancing springs 69 and 70, respectively, for resiliently positioning the piston 53 normally in the shown position.

Second safety valve unit 19 comprises a cylinder-shaped main body 71 formed therein with an axial actuating chamber 72 which is capable of fluidically communicating with respective inlet ports 73 and 74 when respective ball valves 78 and 78' are brought into their open position. More specifically, however, the port 74 is bored axially through a plug 75 which is threadedly coupled with the cylinder main body 71 at its right-hand end as shown. Ports 73 and 74 are formed with respective valve seats 76 and 77 which are normally closed as shown by said ball valves 78 and 78', respectively. For this valve closing purpose, a compression spring 79 is provided between these valve balls which are urged resiliently to maintain their closing position shown.

The main cylinder body 71 is formed with two lateral outlet ports 80 and 81 kept in communication with the actuating chamber 72 and arranged in an opposed relationship to each other and connected with respective pipings 28 and 22, respectively.

Third safety valve unit 25 comprises a main hollow body 82 having an axial interior bore or chamber 83 which mounts slidably a piston 84, valve holders 85 and 86 being kept in pressure contact with the opposite sides of the piston as shown. For this purpose, an urging springs 87 is provided under compression between the lower end wall of main body 82 and the holder 85. In the similar way, a further spring 88 is provided under compression between the upper end wall of main body 82 and the holder 86. Valve members 91 and 92 are suspendedly mounted on the central parts of the holders 85 and 86 by means of springs 89 and 90. These valve members are so mounted that they close ports 93 and 94, respectively, when they are brought into their closing position, as will be more fully described hereinafter. As seen, these ports 93 and 94 are hydraulically connected through pipings 31 and 26 with wheel cylinders 32 and 27, respectively, as was briefly referred to hereinbefore. Valve holders 85 and 86 are formed axial grooves 85a and 86a, respectively, which communicate with chambers 95;96 and 97;98.

Main body 82 is provided with two separated stopper means 101 and 102 backed up with respective springs 99 and 100, said stopper means being normally kept in pressure engagement with the outside peripheries of valve holders 76 and 77, respectively. In case of an unbalanced condition between the hydraulic pressures implied upon the piston 84 at its both sides in the axial direction thereof, as will be more fully described hereinafter, one of said stopper means will serve for fixedly positioning one of the holders 85 and 86, so as to close one of the valves 91 and 92. Main body 82 is formed with separated ports 103 and 104 which are hydraulically connected with said pipings 30 and 24, respectively.

Fourth safety valve unit 44 comprises a main body 105 which is formed with a longitudinal bore 106 receiving slidably therein a hollow piston 107. A valve seat 109 is formed at one end of an axial bore 108 of said hollow piston 107, said seat being adapted for cooperation with an elongated valve member 110 which is slidably received in the axial bore 108. A chamber 111 is formed in the cylinder bore 106, a coil spring 112 being positioned in said chamber 111 and one end of said spring abutting against the inner end of a plug 114 which is threadedly coupled with the lower end of said body 105, for urging said piston 107 to move upwards. Thus, valve member 110 is kept in pressure engagement with valve seat 109 for keeping the latter in its closed state.

In practice, the valve member 110 abuts normally against the inside end wall surface of main body 105. A sealing ring 113 is fixedly attached to the opposite or lower end of valve member 110 and adapted for closing an axial bore 115 formed through said plug 114 when the piston 107 descends against the action of spring 112. Said bore 115 is kept in fluid communication through a lateral passage formed in the body of the plug with an actuating chamber 117 for the piston 107. Inlet port 118 kept in fluid communication with the piping 45 communicates with a chamber 119 which is formed at the upper end of the bore 106. Chamber 111 is kept in fluid communication through a lateral port 120 formed through the wall of said piston 107, with an outlet port 121 bored laterally through the wall of the main body 105.

Oil pressure control valve unit 23 comprises an axial stepped bore 28', a valve holder 29' being received slidably in the right-hand half of the bore 28' when seen in FIG. 1A. The right-hand end of the valve holder 29' is kept normally in abutting condition with a snap ring 32' which is held in position in the right-hand end of the inside wall surface of cylinder bore 28'. An axial blind bore 30' is formed in the valve holder and an intermediate slide 33' is slidably received in the said blind bore. The slide 33' is formed with a ring shoulder 3a', a motion-transmitting coil spring 34' being inserted under compression between said shoulder 33a' and the end wall at 30a' of the said blind bore.

An axial recess 33b' is formed in the slide 33' for receiving, in a pressure abutting condition, the inner end of a conventional pusher rod 36' which is linked with a foot-operated brake pedal, not shown.

A second snap ring 37' is provided at the right-hand end of the blind bore 30' for limiting the extremity of the leftward stroke of the intermediate slide 33'.

A ball valve 39' is received rotatably and shiftably in a counter axial recess 38' formed in the left-hand end of the valve holder 29'. A pressure piston 41' is slidably received in the right-hand part at 40' of the stepped cylinder bore 28', a ring recess 42' being formed on the outer peripheral surface of the piston 41' and an axial bore 93' being formed through the piston. The piston bore 93' and the chamber defined by ring recess 42' are kept in fluid communication with each other through a lateral passage 44' bored through the piston.

The piston 41' normally abuts with its right-hand end against an inwardly projecting collar 45' formed on the cylinder bore wall 28' and defining the critical zone between said right-hand and left-hand halves of the cylinder bore.

A valve seat 46' is formed at the left-hand extremity of the axial bore 93', said valve seat being normally kept in its closed position by engagement with a valving collar 47a' formed on a hollow valve member 47' which is slidably mounted in the axial bore 93'.

The valve member 47' is formed with an axial bore 50' for keeping pressure chambers 51' and 51'' in fluid communication with each other. At the right-hand end of the bore 50', there is formed a valve seat 50a' which is adapted for cooperation with ball valve 39'.

The left-hand 40' of the cylinder bore 28' is closed at its left-hand end by a plug 52' which is theadedly coupled therewith, a compression springs 53' and 54' being inserted under compression between the end wall 52a' of said plug and the valving collar 47', and said end wall and the outer end 46' of the piston 41', respectively. In the valve unit, there are provided several sealing rings positioned at 55', and 57' and 58', respectively, for establishing necessary seal among the related constituent parts of the control valve unit.

A return spring 60' is inserted between the piston 41' and the valve holder 29' under compression.

The companion control valve unit 29 has the same structure as of the foregoing unit 23 so that a further detailed analysis can be omitted for the understanding of the invention. The unloading valve unit 36 comprises a slidable spool valve member 126 formed with three separated lands 123, 124 and 125 and received in a sleeve 122. The left-hand end of the spool valve 126 is exposed to the hydraulic liquid contained in a chamber 127 and a piston-like spring mount 128 abutting against said valve end under pressure exerted by a spring 129 which abuts with its one end on the end wall part shown at 127a and with opposite end on said mount 128.

The chamber 127 is hydraulically connected through a port 130 and a piping 131 to the reservoir 11.

Normally, the spool valve 126 is so positioned that its central land 124 is kept in substantial registration with the center of a ring recess 132 formed in the wall of sleeve 122. When the valve member 126 is actuated in the manner to be described, the land 124 is brought into engagement with a ring shoulder 133, so as to establish an interruption of fluid flow thereat.

The left-hand land 123 interrupts normally fluid communication between two separated ring chambers 134 and 135. When, however, the spool valve is brought into actuation in the manner to be described, a fluid communication will be established between these chambers.

A further chamber 136 formed in the valve unit is kept in fluid communication through a duct 137 with chamber 127 which is kept in communication with the reservoir 11, as was referred to hereinbefore.

Ball valve chamber 139 is positioned in proximity to said chamber 136, through the intermediary of an inwardly projecting ring wall 201. A plunger part 140 constitutes a part of the spool valve which extends outwardly of the right-hand land 125 and is kept in pressure contact with the ball valve 138. A valve seat 141 is formed on the ring wall 201, being provided for cooperation with the ball valve. The ball valve is, however, normally kept in engagement with a further valve seat 142 formed on a ring wall 202, the latter seat having a smaller valve opening than that of the former seat 141. It should be noted that the pressure-receiving area of the plunger 140 is so selected as to have an intermediate value between the larger valve opening at 141 and the smaller valve opening at 142.

In close proximity of the second ring wall 202, a chamber 143 is formed and a smaller plunger 144 extends from within the chamber 143 and kept in engagement with the ball valve 138. The smaller plunger 144 is formed with an axial groove 145 for bringing the chambers 139 and 143 into fluid communication with each other, even when the valve 138 is kept in its operating condition.

At the right-hand end of the plunger 144, a spring mount 146 is kept in pressure contact, a compression spring 147 being inserted between the latter and the end wall part 143a of the valve unit which is further formed with an inlet port 148 connected with the piping 146. The unit is further formed with a lateral port 149 which is connected with the piping 35.

Intensifier 37 comprises larger diameter chambers 150 and 151 and a smaller diameter chamber 152, a stepped piston 155 having a larger piston 153 and a smaller piston 154 being slidably received in these chambers in combination.

To the left-hand side of the chamber 150, there is provided a sleeve 160 which receives slidably a valve plunger 161 having valve lands 156, 157, 158 and 159 and a valve part 156'. This valve plunger is normally so positioned that its land 159 keeps the chambers 162 and 150 in fluid communication with each other, while the land 158 interrupts fluid communication between the chambers 162 and 163 and the land 157 interrupts communication between the chambers 164 and 165, respectively. Under these normal operating conditions, the land 156 keeps the chamber 166 and a duct 167 in fluid communication with each other. At this stage, chamber 166a is kept through ducts 167 and 174 in fluid communication with the chamber 163.

When the valve plunger 163 is actuated in the manner to be described, valve part 156' is kept in pressure engagement with valve seat 168 and communication between the chambers 166 and 167 is interrupted. Land 157 keeps the chambers 164 and 165 in fluid communication and at the same time, the chambers 163 and 162 are kept also in fluid communication. Land 159 is kept in its advanced position into engagement with sleeve land 169, thereby fluid communication between chambers 162 and 150 being interrupted. At this stage, the chambers 162 and 132 are kept in fluid communication with each other through a duct 170 which extends through a duct 171 to check valve 172, thence through duct 173 to the chamber 152. Duct 167 communicates through ducts 174 and 175 to the chambers 163 and 151, respectively. The chamber 150 communicates through a duct 176 with the chamber 164.

Above the valve plunger 161, a small auxiliary piston 177 adapted for carrying out a change-off operation to be described is provided which protrudes into the chamber 150 and brought into cooperative contact with the piston 155 in the course of the operation of the intensifier, as will be more fully described hereinafter.

The pusher piston 177 is urged to move towards right under the action of spring 179 which is mounted in the chamber 178. The left-hand actuating chamber 180 for the pusher piston 177 is kept in fluid communication through duct 181 with the chamber 166, and with ducts 182, 184 and 185. The chamber 134 communicates with the duct 185. The duct 185 communicates through a piping 186 with the power steering unit 38.

Chamber 151 is kept in communication through a duct 183 with a duct 184. Chamber 165 communicates through a duct 187 and chamber 178 does through a duct 188 to the duct 184, respectively. Chamber 152 communicates through a duct 189 with the piping 42.

The operation of the first embodiment so far shown and described is as follows:

Under normal braking conditions, the pump 10 sucks oil through pipings 34 and 12 from the reservoir 11, as was referred to hereinbefore, the thus pressurized oil being conveyed from the pump through the piping 13, the now forcibly opened check valve 14 and the piping 15 to inlet port 54 of the first safety valve unit 16, thence to the passages 51 and 52. By the provision of check valve 41, oil can not flow from the passage 51 through the piping 40 to 42.

Therefore, the pressure oil delivered from the pump will act upon the ball valves 56 and 57 against the action or urging springs 69 and 70, respectively, thus flowing into the chambers 65 and 66.

The oil is conveyed through respective passages 63 and 64 in the piston 58 and 59 into the ports 61 and 62, thence through pipings 20 and 17 to the accumulators 21 and 18, respectively, for being accumulated therein.

The thus accumulated oil will flow through the inlet ports 73 and 74 of the second safety valve unit 19 to the chamber 81 upon forcibly opening valves 78 and 78' against the action of spring 79. Oil is then conveyed from output ports 80 and 81 through pipings 28 and 22 to control valves 21a' and 21a, respectively.

The pressure oil in the accumulator 21 and 18 is kept in communication with the inlet ports 118 and 118a of the fourth safety valve unit 44, thereby keeping the piston 107 at its predetermined balanced position.

The pressure oil contained in the accumulator 18 is kept in communication through passage 43, inlet port 118a and passage 115 to the chamber 111. The pressure prevailing in the chamber 111 is kept in communication through passage 120, port 121 and piping 46 to the port 148 of the unloading valve unit 36, thence through chamber 143, passage 145 and the now opened valve seat 142 to the chamber 139. By this conveyed oil pressure, plunger 140 is urged to move leftwards, thereby the spool valve 126 being moved also leftwards.

At this stage, ball valve 138 is urged to engage with the valve seat 141 under the influence of spring 147, the spool valve 126 being urged to move leftwards, with its land 124 interrupting fluid communication between the chambers 135 and 132 and with its land 123 maintaining the communication between the chambers 134 and 135.

Therefore, the sucked oil by the operating pump 33 is delivered through piping 35, passage 149, chambers 135 and 134, passage 185 and piping 186 to the power steering unit 38, thence through piping 39 back to the reservoir 11. Under these operating conditions, the intensifier 37 is in its inoperative position so to speak.

Under these conditions, when the vehicle driver should depress the brake pedal, so as to advance the pusher rod 36', the transmission member 33' being urged to move leftwards and the holder 29' being also shifted leftwards through the intermediary of the spring 34'. Thus, ball valve 39' is brought into engagement with its valve seat 50a', thereby fluid communication between pressure chamber 51' and reservoir 11 being interrupted.

With further actuation of the brake pedal, the valve 47' will be shifted leftwards under the action of a spring 53' and the valving projection 47a' is separated from its seat 46'. Therefore, the accumulated pressure oil will flow through passage 44' into the chamber 51' and then out through the port 25. Since the oil pressure prevailing in the chamber 51' will act upon the cross-sectional area of the valve rod part 48' of the valve member 47', the operator senses a corresponding brake pedal reaction in an effective manner.

With the brake pedal still further depressed, the left-hand end of the member 33' will brought into direct contact with the end wall in the member 32', with or without further compression of spring 34', and the left-hand end of the member 29' will be brought into engagement with the piston 41'. At this stage, the brake reaction is sensed in terms of the hydraulic pressure prevailing in the chamber 51' and acting upon the cross-sectional area of the piston 41', thus the brake reaction being abruptly increased. Therefore, the piston will act as a kind of stopper means.

Now, when it is assumed that the accumulator should fail to operate, it will be easily acknowledged that the left-hand end of the member 29' will urge the piston 41' to move leftwards, as in the similar way as above described in case of a brake application, the piston moving against the action of springs 54' and the pressure prevailing in the chamber 51' being caused to elevate.

Oil pressure delivered from respective outlet ports 25a' and 25' of control valves 23 and 29 is conveyed through pipings 30 and 24, respectively, to the inlet ports 103 and 104 of the third safety valve unit 25, thence through the chambers 96 and 98 and passages 85a and 86a to the chambers 95 and 97, respectively, thence further through outlet ports 93 and 94 and pipings 31 and 26 to the respective wheel cylinders 32 and 27, for performing the braking action.

Next, consider the abnormal operating condition where either one of the accumulators 21 and 18, as an example the latter should fail to operate, no oil pressure will be available in the right-hand chamber 66 in the first safety valve unit 16, the balance piston 53 being subjected to the corresponding hydraulic urging pressure to move it leftwards. Therefore, the piston will be moved rightwards against the action of spring 68 and virtue of the very existence of the hydraulic urging pressure prevailing in the left-hand chamber 65. The valve 57 is naturally kept in its engaging position with its seat 52b for closing the latter. The valve holder 59 is brought into its stopped position in engagement with the corresponding wall, thereby the port 62 being brought into its fluid flow-interrupting position. Oil will be delivered through port 61.

At the same time, it will be seen that no oil pressure is applied to the port 74 of the second safety valve unit 19, the valve 78' is kept in its engaging position with its mating valve seat 77, under the combined urging force exerted by spring 79 and the hydraulic pressure prevailing in the chamber 72. Therefore, pressure oil will flow in exclusively through the port 73.

In the fourth safety valve unit 44, it will be seen that no pressure oil prevails in piping 43, port 118a and chamber 117, the valve 110 and the piston 107 kept in engagement with each other, and the thus established assembly will descend under the hydraulic pressure prevailing in the chamber 119 and against the action of spring 112, until the lower end of valve 110 is brought into engagement with the inner end 114a of the plug 114 so as to interrupt the port 115 as the sealing pressure, the hydraulic pressure acting upon the sealing member 113 is utilized.

At the next stage, the piston 107 only is brought into engagement with the plug end wall 114a, the valve member 110 being caused to separate from its mating valve seat 109. The hydraulic pressure prevailing in the chamber 119 is conveyed to the unloading valve 36 through passage 108, chamber 111, passage 120, outlet port 121 and piping 46, as in the foregoing way, so as to bring the intensifier 37 into its non-operating position.

Under these operating conditions, the pressure oil delivered from pump 10 will flow into the chamber 65 of the first safety valve unit 16, thence through port 61 to the accumulator 21 for being stored therein. Part of the thus accumulated pressure oil will be conveyed to the port 118 of the fourth safety valve unit 44 and part of the oil will flow through the port 73 of the second safety valve unit 19 so as to open the valve 78 against the action of spring 79, thence the chamber 72 and ports 80 and 81 for communication to the control valves 23 and 29. The remaining braking operation is similar to that described hereinbefore, and thus no further analysis thereof would be necessary to set forth for better understanding of the invention.

Should either one of the hydraulic circuits leading from the third safety valve unit 25 to the wheel cylinders 27 and 32 from a certain or other cause, for instance, the piping 26, fail to operate, the pressure prevailing in the chamber 98 will not be caused to elevate at the beginning stage of the brake application. Therefore, at this stage, the piston 84 will be elevated in its position under the hydraulic pressure in the chamber 95 and against the spring action at 88. Thus, the valve 111 is kept in its seated position, so as to keep its related port in its flow-interrupting position. Stop member 102 will be kept in engagement with groove or recess 86a under the spring action at 100. Therefore, in the further stage, the chamber 98 is kept in a sealed condition and fluid communication between control valve 23 and wheel cylinder valve 138 will be caused to separate from contact with its cooperating larger valve seat 141 and to shift rightwards so as to engage the smaller valve seat 142, thus the spool valve 126 being kept in the shown position. Pressure oil delivered from pump 33 will be conveyed through piping 35 and the port 149 of unloading valve unit 36 into the chambers 135 and 132, thence through passage 170 into the acting chamber 162 of the valve plunger, and further into the chamber 150. At this stage, 37 is kept in an interrupted state.

Should the pump 10 fail to operate and no pressure accumulating job is being performed, or there is only insufficient delivery capacity of the pump 10 be available so as not to replenish the consumed pressure oil in a sufficient way, or in a starting stage of the drive engine so that oil pressure delivered from the pump is insufficient to meet with the operational demands, the chamber 151 is kept in fluid communication through passages 175 and 167, chamber 166, passages 181, 182 and 184 to the reservoir 11. The passage 176 and the chamber 164 are kept in sealed condition as shown in FIG. 1. Therefore, the pressure in the chamber 150 is caused to elevate and the piston 155 is shifted towards right. Thus, the right-hand chamber 152 is increased in its prevailing pressure, the thus increased oil pressure being conveyed through passage 189 and spring 42 to the acting chambers 65 and 66 of the first safety valve unit 16, thence through ports 61 and 62 into the accumulators 21 and 18. The thus accumulated pressure oil will be utilized in the aformentioned way.

When the hydraulic pressure in the chamber 150 attains a predetermined value, plunger 161 receiving the hydraulic pressure at its right-hand end surface 159 is shifted leftwards in FIG. 1B against the action of spring 166', and liquid communication between chamber 166 and passage 167 is interrupted by the left-hand valve land 156, with the right-hand land 158 opening and establishing a liquid communication between the chambers 163 and 162, thereby valve land 156 being acted upon by the pump pressure and the valve plunger 161 being further shifted leftwards against the action of spring 166'. In this way, valve land 159 is brought into such position as to interrupt liquid communication between chambers 150 and 152. At the same time, valve land 157 will shift leftwards, so as to establish a liquid communication between the chambers 164 and 165, thereby oil pressure in the chamber 150 being conveyed through duct 176, chambers 164 and 165, and ducts 187 and 184 to the low pressure circuit 186. Thus, the oil pressure from pump 33 will be conveyed through ducts 174 and 175 to the chamber 151, thereby urging the piston 155 reversably toward left. In this case, the pressure oil supply to the chamber 152 is performed through check valve 172.

When the left-hand end of the piston 155 is brought into engagement with auxiliary piston 177, the latter being urged to move leftwards from the positions shown in FIG. 1B and against the action of spring 179. Thus, at first, port or duct 182 is interrupted and the hydraulic pressure prevailing in the chamber 180 and duct 181 are elevated, bringing the hitherto closing valve land 156 in its valve-open position and establishing a liquid communication between duct 167 and chamber 166. By this operation, valve plunger 161 is returned to the position shown in FIG. 1B. Further, the pressure oil conveyed from pump 33 will act upon the piston 155 which is shifted thereby towards left, so as to provide a pumping action as before, and so on.

By repeating the above-mentioned operation, a prescribed oil pressure will be accumulated in the accumulators 18 and 21.

Upon accumulation of the necessary oil pressure in these accumulators in this way, oil pressure conveyed through the fourth safety valve unit 44 to the plunger 126 of the unloading valve 36 act to the plunger 126 of the unloading valve 36 act to the plunger for shifting it leftwards and the pump pressure will be returned through the low pressure circuit 186 to reservoir 11.

As for the arrangement shown in FIGS. 1A and 1B in combination, there are provided two independent pumps 10 and 33, accumulator means and other pumping means in the hydraulic brake circuit. Such arrangement can be modified in its connection mode as shown in FIG. 2. In this modified arrangement, two independent pumps 10 and 33 are included in respective hydraulic circuits. More specifically, the low pressure, high delivery capacity pump 33 is used in the power-steering circuit, while the high pressure, low delivery capacity pump 10 is used in the hydraulic brake circuit, the former pump being arranged to be used as an auxiliary means for the latter circuit.

When the pump 10, for instance, should fail to operate, the pilot pressure in the accumulator means 18(21) will be utilized for actuation of unloading valve unit 36, so as to deliver pressure oil from pump 33 through piping 209, check valve 210 and further piping 211 to accumulator means 18(21) for being accumulated therein.

A still further modified arrangement shown in FIG. 3 is so connected as to include two hydraulic brake systems instead of a sole hydraulic brake system as is the case shown in FIG. 2.

When the accumulator 18 should fail to operate as an example, the first safety valve 16 is actuated as in the case shown in FIGS. 1A and 1B in combination, so as to interrupt the piping 62, while the fourth safety valve unit 44 is actuated for leading the pilot pressure from the remaining accumulator 21 to the unloading valve unit 36. In this way, the pressure oil delivered from pump 10 will open forcibly the check valve 14 so to supply pressure oil to the first safety valve unit 16. The remaining accumulator 21 will receive pressure oil as usual for pressure accumulation.

In a still further modified arrangement shown in FIG. 4 the intensifier 37 is added to the arrangement shown in FIG. 2.

Should the pump 10 fail to operate, the pressure oil is delivered from pump 33 to accumulator 18(21) at a same pressure as that of the pump 10. By the actuation of the unloading valve 36, the intensifier 37 is also actuated in the similar way as was described hereinbefore by consultation with FIG. 1. The thus pressure-increased oil is further conveyed through piping 209, check valve 210 and further piping 211 to the accumulator 18(21) for being charged therein. Thus, also in this case, the braking effect can be brought about with use of regular hydraulic pressure.

It will be clear from the foregoing that the low pressure, high delivery pump arranged for the power steering and the high pressure, low delivery pump for the braking purpose are actuated simultaneously for the attributed respective services. However, if a failure should occur in the pressure source of the hydraulic brake system, the power-steering pump or the pump pressure in an intensified state will be utilized for the disabled braking system.

Therefore, a substantial safety is provided for the brake system over the corresponding prior art.

What is claimed is:

1. A hydraulic control system for a powered vehicle comprising hydraulic source means, first and second hydraulic servo motors, closed hydraulic circuit means containing said hydraulic [pressure] source means and said first servo motor, accumulator means fluidically connected in said closed hydraulic circuit means, control valve means fluidically connected with said first servo motor and said accumulator means for establishing fluid communication therebetween in response to manual operation of said control valve means, first pump means in said closed circuit means for pumping hydraulic fluid under pressure to said accumulator means, and open hydraulic circuit means for fluidically connecting said second servo motor with said hydraulic [pressure] source means, second pump means in said open hydraulic circuit means for pumping hydraulic fluid under pressure to said second servo motor, unloading valve means in said open hydraulic circuit means, means connecting said closed hydraulic circuit means to said unloading valve means whereby said unloading valve means may act under the influence of the hydraulic pressure prevailing in said closed hydraulic circuit means, and additional means connecting said unloading valve means to said accumulator [valve] means so that said unloading valve means is adapted to deliver hydraulic fluid under pressure from said second pump means to said accumulator means when the pressure of the hydraulic fluid from said first pump means falls below a predetermined pressure.

2. A hydraulic control system as set forth in claim 1 further comprising an intensifier means connected between said unloading valve means and said accumulator means for intensifying the pressure of the hydraulic fluid conveyed from said second pump means to said accumulator means.

3. A hydraulic control system as set forth in claim 1 wherein said first servo motor is comprised of a pair of hydraulically energizable brake means, said control valve means being operable to control the connection of said [accumulators] *accumulator means* with said brake means in response to actuation of a brake pedal and first safety valve means is provided in said closed hydraulic circuit for interruption of hydraulic pressure in the related hydraulic system including [either of said accumulators] *said accumulator means* should it become disabled.

*4. A hydraulic control system as set forth in claim 3 wherein said first safety valve means comprises a cylinder body having a longitudinal and axial bore, a piston slidably mounted in the latter and defining two separate chambers within said bore, a pair of springs adapted for positioning said piston at its balanced position, fluid passage means formed in said piston, inlet port means formed at said cylinder body and kept in respective communication with said separate chambers, said inlet port means leading through respective pipings to said first pump means and said unloading valve means, respectively, and additional control valve means provided in said chambers and adapted for control of fluid communication between said inlet port means and outlet port means formed at said cylinder body and leading to said accumulator means.*

*5. A hydraulic control system as set forth in claim 4 wherein said fluid passage means comprise a cross-shaped passage formed in and through said piston and said additional control valve means are comprised of ball valve means adapted for control of fluid communication between said cross-shaped passage and said separate chambers, respectively, a slidable valve holder means holding said ball valve means, and spring means for urging said holder means toward said piston.*

*6. A hydraulic control system as set forth in claim 4 wherein second safety valve means is provided between said accumulator means, on the one hand, and said control valve means, on the other, for interrupting the fluid communication of a disabled one of said hydraulic circuits related respectively with said accumulator means.*

*7. A hydraulic control system as set forth in claim 6 wherein said second safety valve means comprises a main body having chambers communicating fluidically with said control valve means, two inlet ports formed at said main body and fluidically communicating with said accumulator means, a pair of valve means provided in said chambers adapted for fluid flow interruption between the latter and said inlet ports and spring means urging said both valve means in the interrupting direction of said inlet ports.*

*8. A hydraulic control system as set forth in claim 3 wherein additional safety valve means is provided between said accumulator means and said unloading valve means and actuatable by accumulated fluid pressure in said accumulator means, the operation of said unloading valve means being controlled by actuation of said additional safety valve means.*

*9. A hydraulic control system as set forth in claim 8 wherein said additional safety valve means comprises a main body having a longitudinal and axial bore, a piston slidably mounted in the latter and having a central and axial bore, spring means for urging said piston only in its one axial direction, valve means adapted for cooperation with valve seat means formed on said piston, two chambers formed within said bore and partially defined by said piston and the last mentioned valve means and kept in*

*fluid communication with said accumulator means, respectively, fluid passage means for establishing fluid communication between said last mentioned bore and outlet port means formed at said last mentioned body and kept in fluid communication with said unloading valve means, said foregoing valve means being adapted normally for interrupting one of said two chambers and said outlet port means and further adapted for interrupting fluid communication, should one of related hydraulic circuits with said both chambers become disabled, between the chamber which is related with said disabled circuit, and said outlet port means.*

*10. A hydraulic control system as set forth in claim 3 wherein additional safety valve means is provided between said control valve means and said brake means, for fluid interruption of a disabled hydraulic circuit related with said brake means.*

*11. A hydraulic control system as set forth in claim 10 wherein said additional safety valve means comprises a main body having an internal longitudinal bore, a piston slidably mounted in the latter for partially defining two separate chambers in said bore, spring means adapted for urging said piston towards its balanced position, inlet port means formed at said main body for connecting said chambers and said control valve means, respectively, outlet port means formed at said main body adapted for connecting said both chambers and said brake means in mutual fluid communication, respectively, and a pair of valve means arranged respectively within said both chambers and adapted for control of fluid communication between said both control valve means and said brake means, respectively.*

*12. A hydraulic control system as set forth in claim 3 wherein said unloading valve means comprises a main body having an inner and longitudinal bore, a spool valve member slidably mounted within said bore, a chamber defined by one end of said spool valve member and said main body and in fluid communication with said closed hydraulic circuit, and spring means acting upon the opposite end of said spool valve member for resiliently urging the latter against the action of fluid pressure prevailing in said last mentioned chamber, said spool valve member being adapted for conveying hydraulic pressure from said second pump means towards said accumulator means, should the fluid pressure prevailing in said last mentioned chamber fall below a predetermined level.*

*13. A hydraulic control system as set forth in claim 2 wherein said intensifier means comprises a main body having an inner and longitudinal bore, a piston slidably mounted in the latter for partially defining three separate chambers therein, the first chamber of said three chambers being kept in fluid communication with said second pump means when said unloading valve means is actuated while the second chamber of said three chambers is kept in fluid communication with said second servo motor and the third chamber of said chambers is kept in fluid communication with said accumulator means, the fluid communication between said second chamber and said second servo motor is caused to interrupt and fluid communication between said second chamber and said second pump means is established, while fluid communication between said first chamber and said second pump means is interrupted and that between said first chamber and said second servo motor is established and maintained, when the fluid pressure prevailing in said first chamber attains at least a predetermined level, and further valve means are provided for recovering said first valve means in its initial position when said piston shifts in the reducing direction of the fluid pressure prevailing in said third chamber.*

* * * * *